United States Patent [19]

Schedlbauer

[11] Patent Number: 5,623,121
[45] Date of Patent: Apr. 22, 1997

[54] PYROTECHNIC CHARGE FOR RELEASING ENCLOSED PRESSURIZED GAS

[75] Inventor: Fritz Schedlbauer, Pfinztal, Germany

[73] Assignee: Fraunhofer-Gesellschaft zur Forderung der angewandten Forschung e.V., Munich, Germany

[21] Appl. No.: 432,075

[22] Filed: May 1, 1995

[30] Foreign Application Priority Data

Apr. 30, 1994 [DE] Germany .......................... 44 15 255.8

[51] Int. Cl.$^6$ .................................................. C06B 45/10
[52] U.S. Cl. ............................ 149/19.6; 280/737; 149/92
[58] Field of Search ................................... 149/19.6, 19.9, 149/92; 280/736, 737

[56] References Cited

U.S. PATENT DOCUMENTS

| | | | |
|---|---|---|---|
| 3,679,781 | 7/1972 | Olson et al. | 264/3.1 |
| 3,930,666 | 1/1976 | Lynch et al. | 280/737 |
| 4,043,850 | 8/1977 | Hoffman et al. | 149/19.4 |
| 4,092,188 | 5/1978 | Cohen et al. | 149/19.4 |
| 4,915,755 | 4/1990 | Kim | 149/19.4 |
| 5,016,914 | 5/1991 | Faigle et al. | 280/741 |
| 5,043,030 | 8/1991 | Ramaswamy | 149/16 |
| 5,061,330 | 10/1991 | Reed, Jr. et al. | 149/19.6 |
| 5,067,996 | 11/1991 | Lundstrom et al. | 149/19.4 |
| 5,316,600 | 5/1994 | Chan et al. | 149/19.4 |

FOREIGN PATENT DOCUMENTS

| | | |
|---|---|---|
| 0365809 | 5/1990 | European Pat. Off. . |
| 0591119 | 4/1994 | European Pat. Off. . |
| 2158779 | 6/1973 | France . |
| 2234246 | 1/1975 | France . |
| 2141408 | 3/1972 | Germany . |
| 2329558 | 1/1975 | Germany . |
| 4005871 | 9/1991 | Germany . |
| 2264942 | 9/1993 | United Kingdom . |
| 9321042 | 10/1993 | WIPO . |

*Primary Examiner*—Charles T. Jordan
*Assistant Examiner*—John R. Hardee
*Attorney, Agent, or Firm*—Antonelli, Terry, Stout & Kraus, LLP

[57] ABSTRACT

A pyrotechnic charge for the rapid opening of a bursting closure of a pressurized gas container, particularly for transferring the pressurized gas into another, lower pressure area, e.g. for air bags in motor vehicles, comprises an energy carrier to crystalline nitra-mines, preferably RDX or HMX, and an energy-rich, reactive polymer as the binder, e.g. di- or poly-functional glycidyl-azide polymer (GAP). Such a charge leads to a rapid build-up of the opening pressure and produces adequate heat for avoiding cooling of the gas during the overflow.

5 Claims, 1 Drawing Sheet

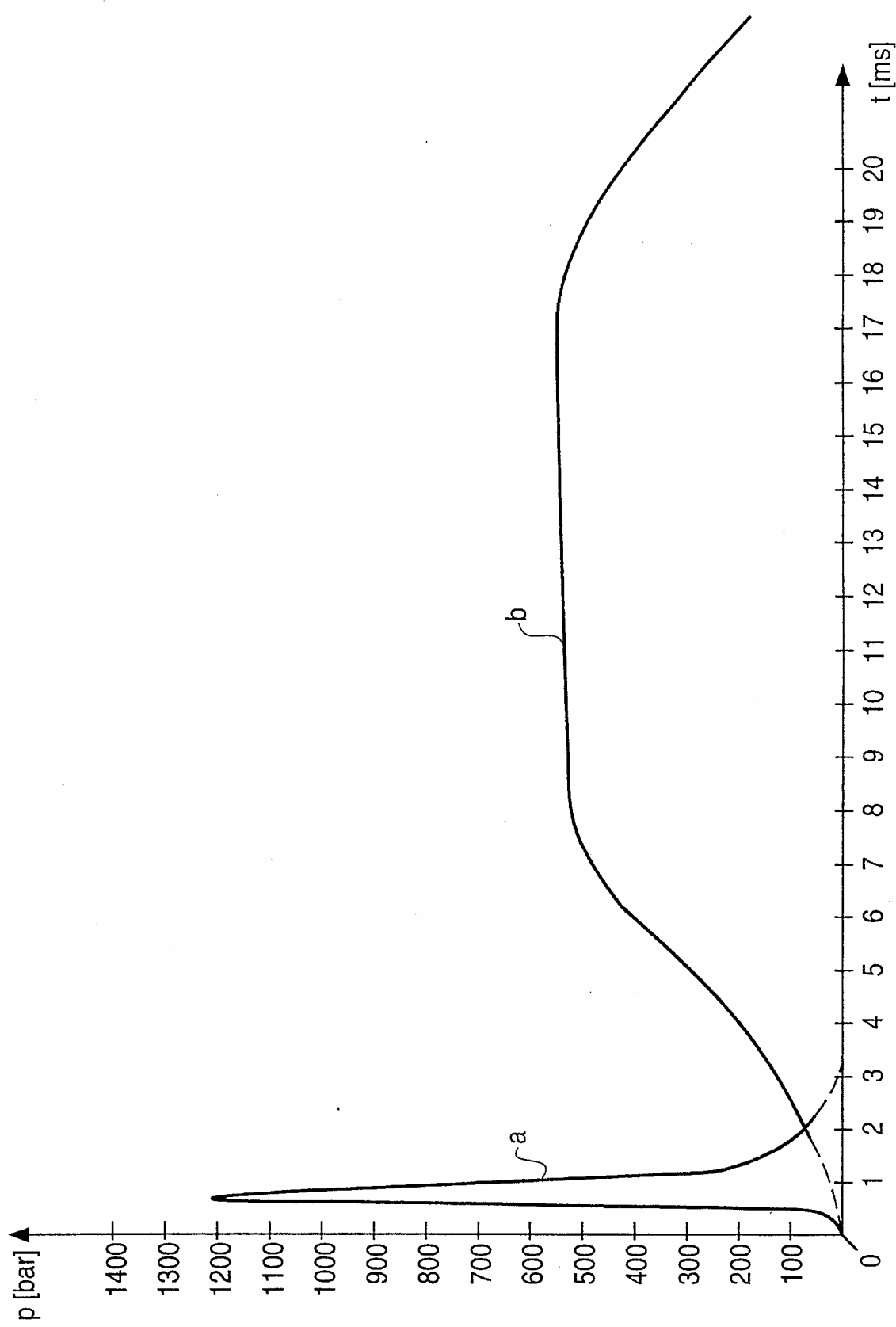

PYROTECHNIC CHARGE FOR RELEASING ENCLOSED PRESSURIZED GAS

FIELD OF THE INVENTION

The invention relates to a pyrotechnic charge for the rapid opening of a bursting closure of a pressurized gas container, particularly for transferring the pressurized gas into another, lower pressure area.

BACKGROUND OF THE INVENTION

Increasing importance is being attached to the provision of pressurized gas for the sudden filling of an area with a previously lower pressure, e.g. ambient pressure in restraining systems is used in motor vehicles, so-called air bags. For this purpose essentially three systems are known up to now. In one case the filling gas is produced by a chemical reaction as needed. However, this presupposes the existence of substances which are able to produce large quantities at the time of their reaction, but in the initial state only have a limited space requirement. For this purpose use can be made of solid propellants, but only those which exclusively or preponderantly produce inert gas, so as not to expose the vehicle occupants to toxic risks. In practice use has mainly been made up to now of sodium azide ($N_2$ production) (DE-A-2,236,175). As a result of the high reaction temperature of about 1500° C. particular heat protection measures are needed on the restraining system, e.g. the bag material. In addition, the bag material must be able to hold back unburned particles of the propellant. Propellant residues left behind after the release are highly toxic. When used in motor vehicles the toxicity of sodium azide constitutes a latent risk to the environment and requires special measures when the vehicles are disposed of.

In place of sodium azide nitrocellulose-based propellants have also been proposed, but in the case thereof higher gas temperatures must be controlled and there is in particular a high proportion of toxic CO, which can lead to flammable mixtures when hydrogen is present. In addition, NC does not have a satisfactory thermal stability.

These disadvantages also apply to numerous other propellants which have been tested.

In addition, hybrid systems are known (WO 91/11347), in which, besides a stored, inert pressurized gas, use is made of a gas-producing propellant. The propellant is ignited on release and the gas produced by the chemical reaction is transferred together with the inert gas into the restraining system. Once again the aforementioned disadvantages occur, although to a lesser extent.

In the third system use is exclusively made of stored, non-toxic pressurized gas, which is transferred from the pressurized gas storage vessel into the restraining system. These systems admittedly have a relatively large space requirement, but are preferable from the safety and environmental standpoints. Such a system requires an opening mechanism on the pressure container acting in milliseconds and for this purpose the container is provided with a bursting closure. Since during the flow from the pressurized gas container into the restraining system the gas is cooled due to the Joule-Thomson effect and icing can occur, corresponding heat must be supplied through the opening mechanism.

The problem of the present invention is to propose a pyrotechnic charge which, in the case of a minimum space requirement, permits a release of the gas stored in the container by destroying the bursting disk within milliseconds and which also compensates the Joule-Thomson effect.

SUMMARY OF THE INVENTION

According to the invention this problem is solved by the features of claim 1. The crystalline nitramines used, e.g. hexogen (RDX) or octogen (HMX) are high energy substances, which are characterized by a high storage stability, more particularly by a high thermal stability and which are also safe as regards handling and operation, because they cannot readily be initiated by friction or pressure.

The disperse nitramines are, according to the invention, bound into an energy-rich, reactive polymer matrix. With the aid of this pyrotechnic charge following an ignition in milliseconds a sufficiently high gas pressure can be built up to open the bursting disk, the reaction not taking place in explosive manner due to the binder, but instead lasts roughly 10 milliseconds, so that the heat occurring during the exothermic reaction adequately heats the pressurized gas flowing passed the destroyed bursting disk in order to be able to keep the same e.g. in the ambient temperature range. As a result of the inventive choice of the energy carrier and binder, the charge can be kept so small that any toxic gases which may form are rarefied to such an extent by the overflowing pressurized gas, e.g. air, that they are physiologically unobjectionable. The charge according to the invention retains its function, even in the case of high thermal shock stressing and can without difficulty be bound into the mass production system used e.g. for air bags, because despite the energy carrier the components thereof can be comparatively easily processed to granules or shaped articles, e.g. perforated cylinders. Since, due to its energy density, the pyrotechnic charge only has to be incorporated in a small quantity, it also causes no particular disposal problem.

A di- or poly-functional glycidyl-azide polymer (GAP) has proved to be particularly satisfactory as the binder.

These polymers, which are known per se in connection with propellants, are characterized by their high energy content and at the same time good bondability. Diisocyanates are used for polymerization.

The pyrotechnic charge can also have energy-rich, gas-forming substances, e.g. nitroguanidine (NG) or triaminoguanidine nitrate (TAGN), which lead to an increase in the gas quantity formed during the reaction and therefore to a pressure build-up, thereby ensuring a reliable opening of the bursting disk. Unlike in the case of the hitherto used, gas-supplying substances no particles or combustion residues are formed.

The pyrotechnic charge can also have an energy-rich plasticizer for the polymer e.g. bis-2,2-dinitropropyl-acetal (BDNPA) or formal (BDNPF). The plasticizer also contributes to increasing the energy content of the overall composition.

Tetracene can also be added to the pyrotechnic charge for reducing the ignition delay time.

The aforementioned pyrotechnic charge can be successively used alone in this composition. However, with large gas quantities, small overflow cross-sections, etc., it can be advantageous to provide, in addition to the aforementioned pressure charge, a heat-supplying charge. The pressure charge should open the bursting closure in the 2 ms range and produce a pressure of around 1200 bar.

Such a heat-supplying charge can e.g. be characterized by a low content of crystalline energy carrier and a higher content of gas-forming substance. Instead of this it is also possible to provide roughly the same crystalline energy carrier content, but using a binder with a lower energy content. For this purpose it is e.g. possible to use hydroxyl-terminal group-containing polybutadiene. The heat-supplying charge should have a burning time of approximately 20 ms for a pressure of approximately 600 bar.

BRIEF DESCRIPTION OF THE DRAWINGS

The sole FIGURE accompanying the application is a diagram illustrating a pressure/time curve for a combined pressure/heating charge.

DETAILED DESCRIPTION OF THE INVENTION

Hereinafter are given particularly advantageous examples for the composition of the pyrotechnic charge.

| Example 1 | | Example 2 | |
|---|---|---|---|
| Polyglycidyl azide | 13.5% | Polyglycidyl azide | 13.5% |
| Octogen | 85.7% | Octogen | 75.7% |
| Diisocyanate | 1.7% | Diisocyanate | 1.7% |
| Wetting agent | 0.1% | Wetting agent | 0.1% |
| | | NQ/TAGN | 8.0% |
| | | BDNPA/BDNPF | 2.0% |
| Example 3 | | Example 4 | |
| Pressure charge | | | |
| Polyglycidyl azide | 13.5% | Polyglycidyl azide | 13.5% |
| Octogen | 83.7% | Octogen | 84.7% |
| Diisocyanate | 1.7% | Diisocyanate | 1.7% |
| Wetting agent | 0.1% | Wetting agent | 0.1% |
| BDNPA/BDNPF | 2.0% | Tetracene | 1.0% |
| Heating charge | | | |
| Polyglycidyl azide | 14.0% | HTPB | 12.5% |
| Octogen | 60.0% | Octogen | 81.0% |
| Diisocyanate | 2.0% | Diisocyanate | 1.4% |
| Wetting agent | 0.1% | Wetting agent | 0.1% |
| NQ/TAGN | 23.9% | NQ/TAGN | 5.0% |

Whereas in examples 1 and 2 exclusively a high energy density pyrotechnic charge was used, examples 3 and 4 contain a combination of a pressure charge similar to that of examples 1 and 2 and a heat-supplying charge, which either contains for a lower energy carrier content a high gas-forming substance content or for roughly the same energy carrier content a less energy-rich binder. The attached diagram shows the pressure/time curve for such a combined pressure/heating charge. Curve a shows the time path of the pressure charge and curve b the path for the heating charge.

I claim:

1. A pyrotechnic charge for the rapid opening of a bursting closure of a gas container containing non-toxic pressurized gas for transferring the pressurized gas into an airbag of a person restraining system, said charge comprising an energy carrier of a crystallized nitramine, an energy-rich, reactive polymer as a binder and an energy-rich, gas-forming substance; said energy carrier being hexogen (RDX) or octogen (HMX), the binder being a di- or poly-functional glycidyl-azide polymer (GAP), and the energy rich, gas-forming substance being nitroguanidine (NG) or triaminoguanidine nitrate (TAGN) admixed with a heat-supplying charge, wherein the heat-supplying charge has roughly the same content of the crystalline energy carrier and a binder with a lower energy content.

2. A combined charge according to claim 1, further containing an energy-rich plasticizer for the polymer.

3. A combined charge according to claim 2, wherein the energy-rich plasticizer is bis-2,2-dinitropropyl-acetal (BDNPA) or -formal (BDNPF).

4. A combined charge according to claims 1, wherein said charge contains tetracene for shortening the ignition delay time.

5. A combined charge according to claim 1, wherein the binder with lower energy content is hydroxyl-terminal group-containing polybutadiene.

* * * * *